United States Patent [19]

McMahan et al.

[11] Patent Number: 4,952,310
[45] Date of Patent: Aug. 28, 1990

[54] INTRACHANNEL CLARIFIER

[76] Inventors: Anthony A. McMahan, 420 Bayberry La., Naperville, Ill. 60540; Donald C. Voek, 934 Lorlyn Cir., Batavia, Ill. 60510

[21] Appl. No.: 216,154

[22] Filed: Jul. 7, 1988

Related U.S. Application Data

[63] Continuation-in-part of Ser. No. 21,138, Mar. 3, 1987, abandoned.

[51] Int. Cl.$^5$ .............................................. C02F 3/20
[52] U.S. Cl. ............................ 210/195.3; 210/170; 210/220; 210/521; 210/532.1; 210/926
[58] Field of Search ............... 210/608, 626, 627, 628, 210/195.3, 715, 220, 521, 522, 170, 525, 926, 532.1, 540, 776

[56] References Cited

U.S. PATENT DOCUMENTS

| | | | |
|---|---|---|---|
| 2,272,026 | 3/1942 | Spaulding | 210/715 |
| 2,428,756 | 10/1947 | Lind | 210/525 |
| 2,938,867 | 5/1960 | Griffin | 210/715 |
| 3,068,172 | 12/1962 | Leviel | 210/715 |
| 3,149,071 | 9/1964 | Buegoon | 210/608 |
| 3,275,129 | 9/1966 | Ludwig | 210/608 |
| 3,275,157 | 9/1966 | Stamps | 210/521 |
| 3,477,578 | 11/1969 | Bahr | 210/138 |
| 3,745,115 | 7/1973 | Olsen | 210/776 |
| 3,817,383 | 6/1974 | Michel et al. | 210/170 |
| 3,864,247 | 2/1975 | Fuchs | 210/608 |
| 3,953,328 | 4/1976 | Aldag | 210/628 |
| 3,993,568 | 11/1976 | Fux | 210/527 |
| 4,054,524 | 10/1977 | Mackrle | 210/521 |
| 4,199,452 | 4/1980 | Mandt | 210/195.3 |
| 4,226,714 | 10/1980 | Furness et al. | 210/723 |
| 4,226,717 | 10/1980 | Malm | 210/195.1 |
| 4,259,182 | 3/1981 | Belveal | 210/626 |
| 4,303,516 | 12/1981 | Stensel et al. | 210/195.4 |
| 4,362,625 | 12/1982 | Beard | 210/521 |
| 4,383,922 | 5/1983 | Beard | 210/521 |
| 4,436,632 | 3/1984 | Beard | 210/776 |
| 4,455,239 | 6/1984 | Morrow | 210/521 |
| 4,457,844 | 7/1984 | Beard | 210/624 |
| 4,487,692 | 12/1984 | Kersten | 210/194 |
| 4,512,895 | 4/1985 | Reid | 210/926 |
| 4,626,353 | 12/1986 | Beard | 210/926 |

FOREIGN PATENT DOCUMENTS 2075856  4/1981  United Kingdom ............... 210/926

OTHER PUBLICATIONS

Assessment of Design Tradeoffs When Using Intrachannel Clarifier by: Jon H. Bender, dated Oct. 6, 1986, pp. 1–23.
ClariCone Reactor-Clarifier by: Walker Process Division of Chicago Bridge & Iron Company, Bulletin No. 5-W-78, entire document, 12/9/82.

*Primary Examiner*—Ernest G. Therkorn
*Attorney, Agent, or Firm*—Willian Brinks Olds Hofer Gilson & Lione

[57] ABSTRACT

An intrachannel clarifier for an oxidation ditch includes an enclosure positioned in the flow path of the oxidation ditch. This enclosure defines a perimeter wall which surrounds an internal volume made up of an upper zone, a middle zone and a lower zone. The cross-sectional area of the internal volume increases progressively from the lower zone to the upper zone. A water inlet port introduces waste water from the flow path into the lower zone, a submerged pipe in the upper zone removes clarified water from the upper zone, and sludge is actively removed from the middle zone via a sludge removal manifold disposed in the middle zone to reduce the residence time of sludge in the middle zone while maintaining a filter blanket of sludge in the middle zone.

21 Claims, 7 Drawing Sheets

INTRACHANNEL CLARIFIER

CROSS REFERENCE TO RELATED APPLICATION

This application is a continuation in part of patent application Ser. No. 07/021,138 filed Mar. 3, 1987, now abandoned.

BACKGROUND OF THE INVENTION

This invention relates to an improved intrachannel clarifier for use in clarifying an effluent in a waste water treatment facility such as an oxidation ditch.

Waste water which is treated in an activated sludge process is commonly continuously circulated around a channel of an oxidation ditch that acts as an aeration basin. Bacteria in the oxidation ditch decompose wastes in the waste water, and a clarifier is then used to remove solids from the waste water to form a clear effluent.

Recently, intrachannel clarifiers which are positioned within the oxidation ditch have been designed, as exemplified by the clarifiers described in the following U.S. Pat. Nos.: Stensel U.S. Pat. No. 4,303,516, Cerwick U.S. Pat. No. 4,446,018, Kersten U.S. Pat. No. 4,487,692, Morrow U.S. Pat. No. 4,455,239, Beard U.S. Pat. No. 4,383,922, Beard U.S. Pat. No. 4,362,625, Beard U.S. Pat. No. 4,436,632 and Beard U.S. Pat. No. 4,457,844. Several of these clarifiers are discussed in a paper entitled *Assessment of Design Tradeoffs When Using Intrachannel Clarifiers.* by Jon H. Bender (Water Pollution Control Federation, 59th Annual Conference, Los Angeles. Calif. Oct. 6-9, 1986).

All of the intrachannel clarifiers described in the above-identified documents rely on settling processes to remove solids through ports in the bottom of the clarifier. The clarifiers shown in the Cerwick, Morrow, Kersten and Beard patents rely entirely on passive settling processes to remove solids from the clarifier. The device shown in the Stensel patent uses a scraper system to move settled solids across a floor panel toward ports arranged along the sides of the floor panel.

When simple settling processes are relied upon to remove solids from an intrachannel clarifier, solids may remain suspended within the clarifier for an excessive period of time. When this happens, the solids can evolve gases which cause the solids to float. Such floating solids may contaminate the effluent and cause the clarifier to fail to remove solids from the effluent to a satisfactory degree. In order to reduce such problems, regular cleaning is often required to remove solids from the clarifier.

Furthermore, if an intrachannel clarifier occupies an excessive portion of the flow path of the oxidation ditch, the clarifier can act as a partial dam which reduces the flow velocity in the flow path and causes excessive settling of solids in the oxidation ditch itself. When this occurs, the energy required to mix and add oxygen to the ditch contents increases, and unusually frequent cleaning and maintenance of the oxidation ditch may be required.

The present invention is directed to an improved intrachannel clarifier which actively controls the residence time of solids within the clarifier in order to minimize problems related to solids-evolved gases and floating solids within the clarifier.

SUMMARY OF THE INVENTION

In the preferred embodiment described below, the clarifier includes an enclosure positioned in the flow path of an oxidation ditch. This enclosure comprises a perimeter wall which surrounds an internal volume which comprises an upper zone, a middle zone and a lower zone. The cross-sectional area of this internal volume increases progressively from the lower zone to the upper zone. A water inlet port is positioned in the lower zone to introduce waste water from the flow path into the enclosure. Means are positioned in the upper zone for removing clarified water from the upper zone, and means are provided for actively removing sludge from the clarifier via a sludge removal manifold disposed in the middle zone.

This embodiment controls the residence time of sludge within the clarifier by actively removing sludge from the middle zone of the clarifier, and thereby minimizes problems associated with floating solids. In this way, the clarity of the effluent is improved, and maintenance procedures for removing solids from the clarifier are minimized.

As described below, the preferred embodiment of this invention is shaped to provide an excellent tradeoff between the competing goals of minimizing the cost of the clarifier and minimizing the flow restriction in the oxidation ditch caused by the clarifier. Furthermore, this embodiment can be used to remove sludge from the oxidation ditch, thereby reducing or eliminating the need for conventional systems for removing sludge from the oxidation ditch.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figures 1, 2:
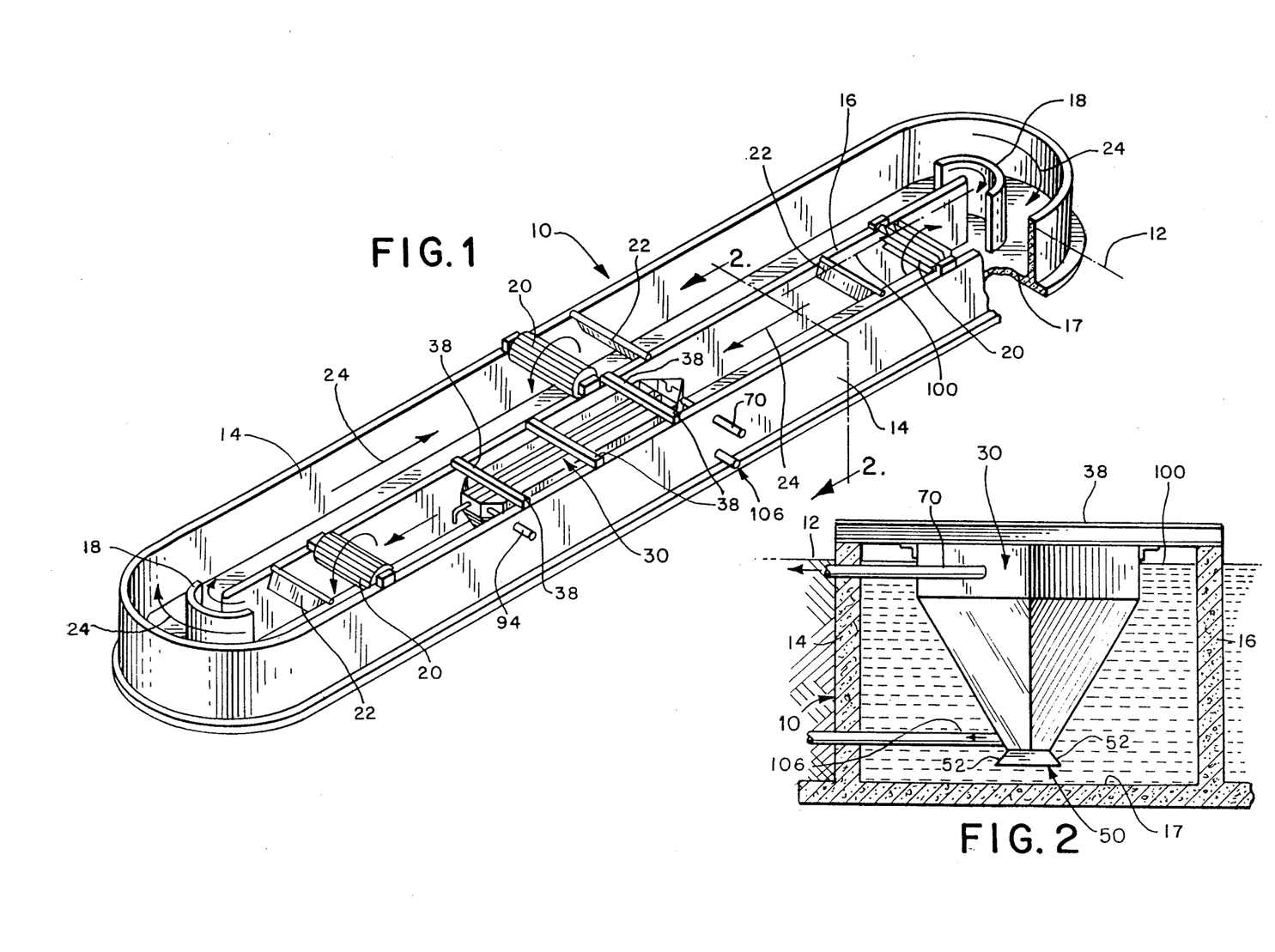
FIG. 1 is a perspective view of an oxidation ditch in which is mounted a first presently preferred embodiment of the intrachannel clarifier of this invention.
FIG. 2 is a fragmentary section taken along line 2—2 of FIG. 1.

Turning now to the drawings. FIG. 1 shows a perspective view of an oxidation ditch 10 in which is mounted a clarifier 30 which incorporates a first presently preferred embodiment of this invention.

The oxidation ditch 10 includes an outer wall 14, a center wall 16 and a floor 17. Conventional construction techniques can be used to form the oxidation ditch 10, which is typically placed in large part below ground level 12. Deflector walls 18 are placed at either end to maintain adequate flow velocities at the ends of the oxidation ditch 10. In the conventional manner, the oxidation ditch 10 includes rotors 20 which both propel waste water in the oxidation ditch 10 to move around a flow path defined by the oxidation ditch 10, and aerate the waste water. Baffles 22 are provided downstream of the rotors 20 to provide proper mixing of waste water aerated by the rotors 20. Rotors are preferred, but alternatives such as systems using air and pumps or propellers may be substituted for rotors. The arrows labeled with reference numeral 24 indicate the direction of flow of the waste water in the oxidation ditch 10.

The features of the oxidation ditch 10 described above are conventional and well known to those skilled in the art. They have been provided merely to define the environment of the present invention, and do not form part of this invention. For this reason, they will not be described in greater detail here.

According to this embodiment of the invention, the clarifier 30 is suspended in the center of the flow channel on support beams 38. The support beams 38 extend between the center wall 16 and one of the outer walls 14 and hold the clarifier 30 fixedly in position (FIG. 2). The clarifier 30 includes a central section 32 and a front section 34. The front section 34 and the rear portion of the central section 32 are streamlined to minimize turbulence and flow restriction created by the clarifier 30.

Figures 3, 4:
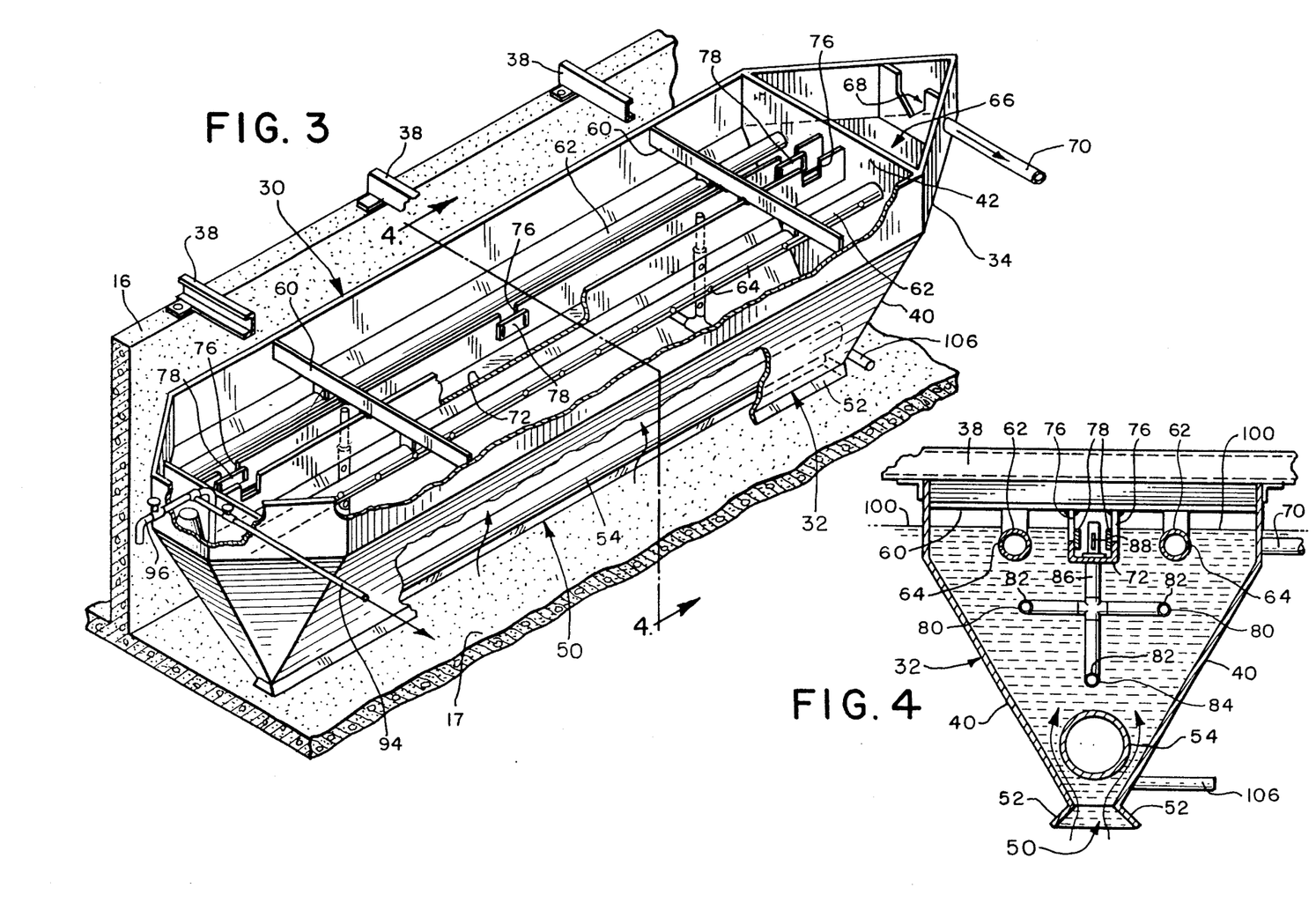
FIG. 3 is an enlarged perspective in partial cutaway of the clarifier of FIG. 1.
FIG. 4 is a cross section taken along line 4—4 of FIG. 3.
Figure 5:
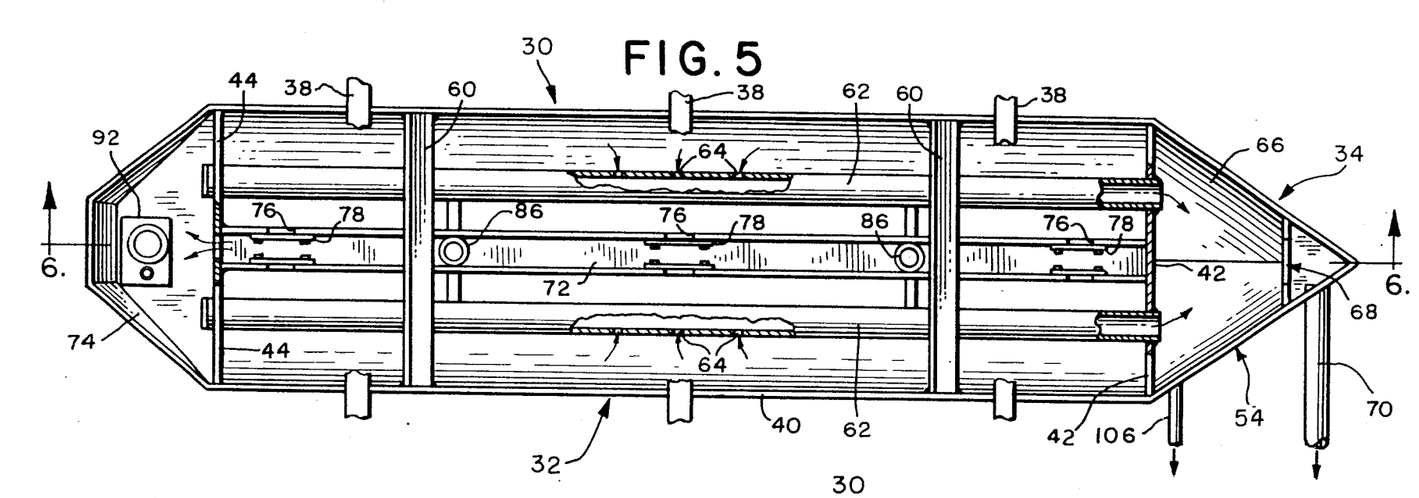
FIG. 5 is a top plan view of the clarifier of FIG. 3.
Figure 6:
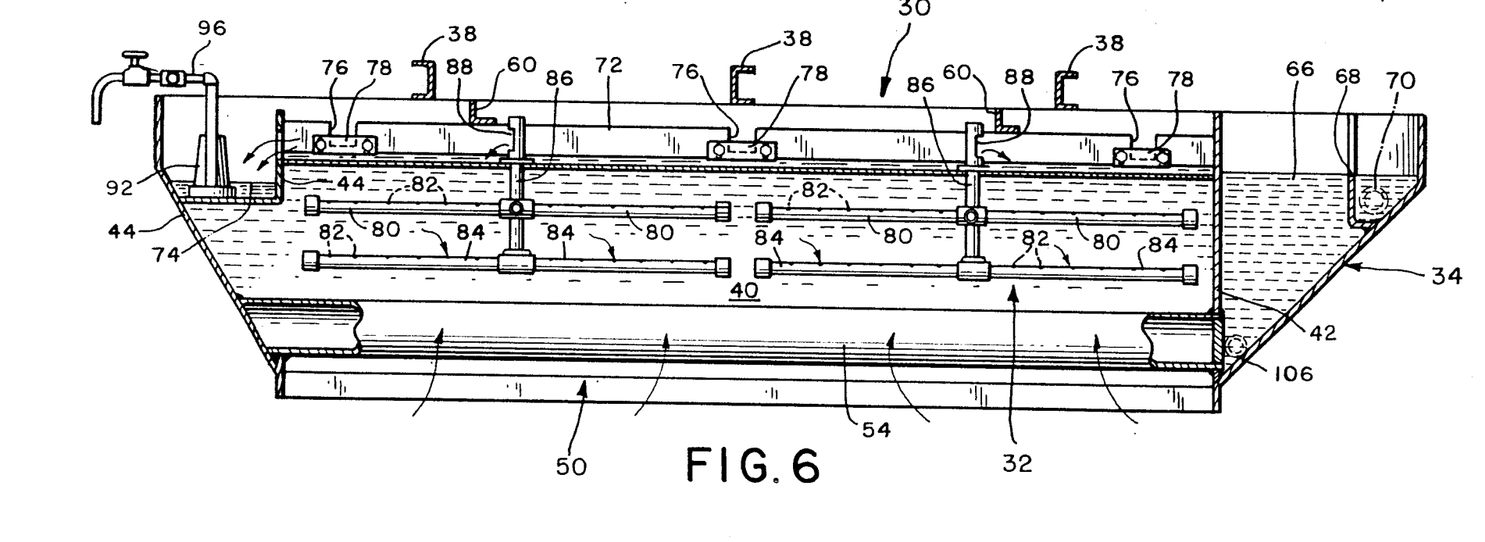
FIG. 6 is a longitudinal taken along line 6—6 of FIG. 5.
Figure 7:
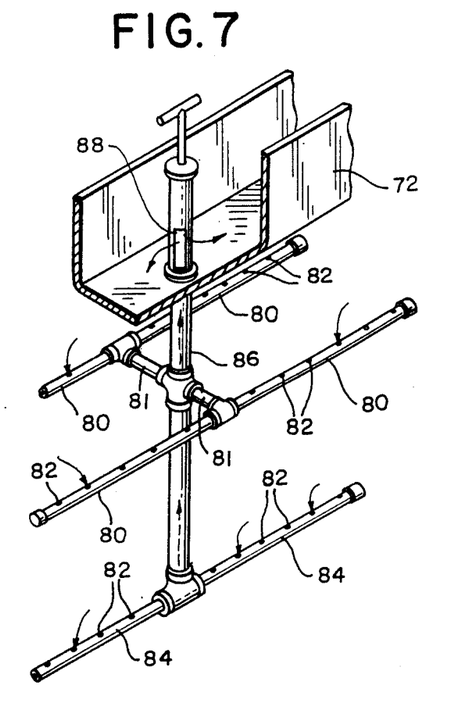
FIG. 7 is a fragmentary perspective of a portion of the clarifier of FIG. 3.

As best shown in FIGS. 4-6, the central section 32 is defined between two converging side walls 40, a front wall 42 and a rear wall 44. Together, the walls 40, 42 and 44 form an enclosure which is open only at the top and bottom and which defines an interior volume in which flow velocities can be carefully controlled to achieve the desired separation.

The bottom portion of the clarifier 30 defines a single, elongated waste water entry port 50 which extends along the length of the central section 32 and is oriented parallel to the direction of flow 24 (FIG. 6). A pair of stilling plates 52 are mounted to the lower edges of the side walls 40, each on a respective side of the entry port 50. A cylindrical deflector tube 54 is positioned directly above the entry port 50 to break up the flow of incoming waste water and to ensure that the incoming flow spreads laterally across the width of the clarifier 30.

As best shown in FIGS. 4-6, two or more support braces 60 extend across the central section 32 and support a set of effluent pipes 62 in place. In this embodiment two effluent pipes 62 are shown. Of course, the number of effluent pipes 62 should be chosen as appropriate for the particular application, and larger clarifiers may use more than two effluent pipes 62. These effluent pipes 62 extend along substantially the entire length of the central section 32, and each defines an array of effluent ports 64. The effluent pipes 62 are preferably positioned entirely below water level. By drawing off the effluent from the interior of the central section 32 into the effluent pipes 62 along the entire length of the central section 32, the horizontal velocity of waste water within the central section 32 induced by the effluent pipes 62 is minimized. The effluent pipes 62 communicate at one end with an effluent well 66 which is deeper than the effluent pipes 62. The clarified effluent is removed from the effluent well 66 via an exit port 68, as for example by a suitable pump, siphon, or gravity drain (not shown). In this way the water level in the effluent well 66 is maintained at a lower level than the water level in the central section 32.

As best shown in FIGS. 4-7, the clarifier 30 also includes at least one sludge removal trough 72 which also extends along the length of the central section 32. Of course, larger clarifiers may use more than the single trough 72 shown in the figures. This sludge removal trough 72 communicates at one end with a sludge well 74, which is somewhat deeper than the sludge removal trough 72. The sludge removal trough 72 defines a plurality of skimming ports 76. The lower edge of each of the skimming ports 76 is defined by a respective adjustable weir 78. These weirs 78 are adjusted to be slightly below the level of water in the central section 32.

As best shown in FIGS. 4-7, the sludge removal trough 72 supports a pair of sludge return pipes 86. Each of the sludge return pipes 86 in turn supports a pair of upper sludge manifolds 80 and a lower sludge manifold 84. Each of the manifolds 80, 84 defines an array of sludge removal ports 82. The manifolds 80, 84 extend over substantially the entire length of the central section 32. In this way, the horizontal velocity of water in the central section 32 induced by the manifolds 80, 84 is minimized. The uppermost ends of the sludge return pipes 86 terminate in respective orifices 88 positioned within the sludge removal trough 72. Thus, waste water which enters the sludge removal ports 82 is free to move up the sludge return pipes 86 into the sludge removal trough 72 via the orifices 88. Three sludge return pipes 86 are shown. The preferred number will vary with the size of the clarifier.

A sludge pump 92 is positioned in the sludge well 74 and pumps material from the sludge well 74 out of the clarifier 30 via a sludge waste line 94 and a sludge return line 96 (FIG. 3). The sludge waste line 94 is used to remove sludge from the oxidation ditch 10, while the sludge return line 96 is used to return sludge from the clarifier 30 back to the oxidation ditch 10. For example, the sludge waste line 94 can be used to transport sludge from the oxidation ditch 10 to the plant head.

The water level within the central section 32 is the same as the water level 100 in the oxidation ditch 10. This is in part because the waste water entry port 50 defines a significantly larger cross-sectional area than the combination of the effluent ports 62, the skimming ports 76 and the sludge removal ports 82.

The following details of construction are provided only to define the presently preferred embodiment. Though preferred, these details are not essential for all applications. Generally, the length of the center section 32 is between 5 and 9 times the width of the center section 32. The area of the top part of the center section 32 is selected to provide a clarified effluent removal rate of about 600 gallons/day/square ft. The width of the top part of the center section 32 is preferably between 60%–70% of the width of the flow path of the oxidation ditch 10. The side walls 40 preferably slope inwardly at a slope of 45°, and the top vertical part of the side walls 40 is preferably about 1.5 feet in height.

The ports 64 are preferably spaced about 18 inches apart, and are sized to remove 225 gallons each per day, thereby removing a total of 600 gallons/day/square foot of area of the top of the center section 32. The ports 82 are preferably 12 inches apart and are sized to remove between 40 and 100 gallons each per day, thereby removing a sludge volume which is 20%–50% of the volume of removed effluent.

Materials can be varied widely, depending on the application. The pipe like components 54, 62, 80, 84, 86 can be formed of steel, polyvinyl chloride, or even cast iron. The remainder of the clarifier can be formed of a range of materials, including galvanized steel, stainless steel, and fiberglass.

Preferably the pump 92 is controlled to ensure that the volume of sludge removed from the clarifier 30 via the lines 94, 96 is between 20% and 50% of the volume of effluent removed via the pipe 70. A valve can be provided on the pipe 70 to control the volume of effluent that is removed. Preferably the cross sectional area of the waste water entry port 50 is about 5% of the cross sectional area of the top of the central section 32 and the flow rates are adjusted such that waste water flows through the port 50 at the rate of about 12,000 gallons per day per square foot. This flow rate is high enough to ensure that substantially no sludge leaves the clarifier 30 out the port 50. Preferably the total cross sectional area between the deflector tube 54 and the side walls 40 at the points of closest approach is equal to the cross sectional area of the port 50. This ensures that the upward movement of waste water around the tube is maintained. When the tube 54 is centered as shown in FIG. 4, the minimum separation between the tube 54 and each side wall 40 is preferably one-half the width of the port 50.

The tube 54 is preferably sealed at both ends and filled with air to provide flotation. The pipe 106 can be used to drain water from the front section 34 as the clarifier is lifted out of the ditch 10, or as the ditch 10 is drained. In operation, the pipe 106 is normally closed to ensure that the front section 34 is filled with clarified effluent and is isolated from the contents of the ditch 10.

Briefly, the clarifier 30 operates as follows. Waste water including entrained solids or sludge enters a lower zone of the central section 32 of the clarifier 30 via the entry port 50. The stilling plates 52 are oriented to minimize the horizontal velocity of water within the central section 32. The waste water and entrained solids move upwardly, toward the effluent ports 64 in the upper zone of the central section 32. As shown in FIG. 4, the cross-sectional area of the central section 32 increases in the upward direction. For this reason, the vertical velocity of rising waste water within the central section 32 decreases as the water approaches the effluent ports 64. This decreasing vertical velocity gradient causes a decreasing vertical density gradient of solids suspended in the rising waste water. In particular, the suspended solids remain in an intermediate zone around the upper sludge manifolds 80. Above this intermediate zone the effluent is clear and relatively free of solids. In effect, the suspended solids in the intermediate zone form a filter blanket through which the waste water moves as it approaches the effluent ports 64. This filter blanket removes suspended solids efficiently from the waste water to insure that minimal solids are transported into the effluent well 66.

The deflector tube 54 plays an important role in promoting formation of a stable filter blanket as described above. The horizontal velocity of fluid flow in the oxidation ditch can disrupt formation of a stable filter blanket. In particular, if the upward flow of water through the entry port 50 is not spread laterally (across the width of the clarifier 30 transverse to the flow path), incoming water may remain centered as it moves toward the rear wall 44. In this case, the incoming water may severely disrupt the filter blanket after it strikes the rear wall 44. The deflector tube 54 solves this problem by breaking up the incoming waste water to insure that the incoming flow spreads laterally across the width of the clarifier 30.

The effluent ports 64 are positioned below water level and allow clarified effluent to pass from the upper zone of the central section 32 into the effluent pipes 62. This clarified effluent then passes via the effluent pipes 62 into the effluent well 66 where it is removed from the clarifier 30.

The clarifier 30 actively removes solids from the intermediate zone in order to control the residence time of solids in the clarifier 30 and therefore to reduce the volume of floating solids. As explained above, solids which remain within the clarifier for an extended period of time may evolve gases which cause the solids to float, thereby contaminating the effluent removed from the clarifier.

In the clarifier 30, this active solids removal system includes the sludge manifolds 80, 84, the sludge return pipes 86 and the orifices 88. The orifices 88 are positioned below the level of water within the central section 32. The sludge pump 92 removes material from the sludge well 74 to maintain the liquid level in the sludge removal trough 72 below the water level inside the central section 32. Preferably, a float switch (not shown) shuts off the pump 92 in the event the sludge well 74 is pumped empty. The level differential between the interior of the central section 32 and the trough 72 causes waste water and suspended solids to enter the manifolds 80, 84 via the sludge removal ports 82 and to travel up the sludge return pipes 86 and into the sludge removal trough 72 via the orifices 88.

The sludge pump 92 pumps sludge from the sludge well 74 out of the clarifier 30 via the sludge waste line 94 and the sludge return line 96, each of which is provided with a respective shut off valve. By suitably controlling the valves on the lines 94, 96, or the size of the orifices 88, the volume of sludge removed from the central section 32 can be adjusted to control the thickness and density of the filter blanket adjacent to the upper sludge manifolds 80. If the pumping rate is excessively high, the filter blanket will be too thin and low in density. Conversely, if the pumping rate is too low, the filter blanket will be excessively thick and high in density, and the filter blanket may evolve gases which tend to cause solid material to float upwardly toward the effluent ports 64.

The weirs 78 of the skimming ports 76 are preferably positioned about one-quarter inch below the water level in the central section 32 in order to allow floating debris to move out of the central section 32 into the sludge trough 72 for subsequent removal by the pump 92. Because the effluent pipes 62 are completely submerged, they do not obstruct the flow of floating debris to the skimming ports 76.

Figure 8:
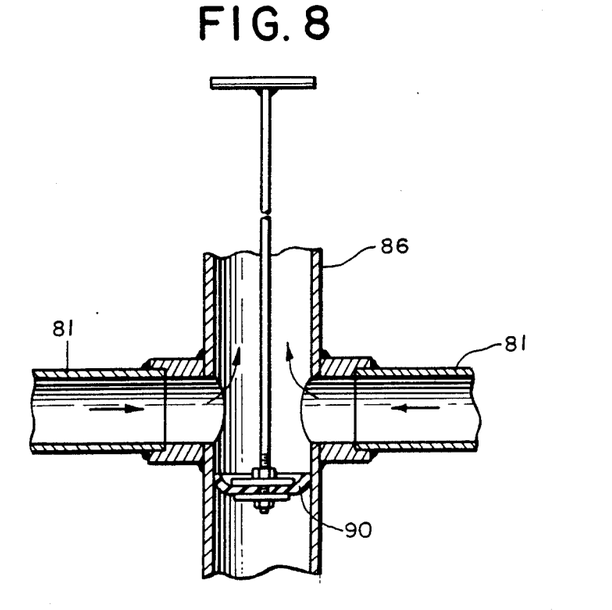
FIG. 8 is a partial section of a removable plug usable with the apparatus of FIG. 7.
Figure 9:
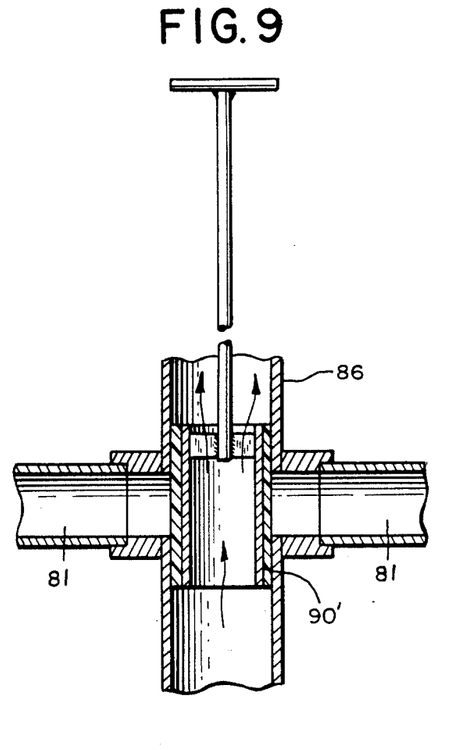
FIG. 9 is a partial section of an alternate plug usable with the apparatus of FIG. 7.

The sludge manifolds 80, 84 allow the solids content of the sludge withdrawn via the sludge removal trough 72 to be controlled within limits. As shown in FIGS. 8 and 9, two alternate removable plugs 90, 90' are provided. The removable plug 90 shuts off the lower sludge manifold 84 from the sludge return pipe 86 and ensures that all of the sludge moving into the sludge removal trough 72 is withdrawn from the central section 32 via the upper sludge manifolds 80. Similarly, the removable plug 90' seals the upper sludge manifolds 80 from the sludge return pipe 86 and insures that only the lower sludge manifolds 84 draw sludge into the sludge removal trough 72. Typically, the solids content of sludge adjacent the lower sludge manifolds 84 is higher than the solids content of sludge adjacent the upper sludge manifolds 80. The removable plug 90' can be used to maximize the solids content in the sludge pumped by the pump 92, as for example when the sludge is to be wasted via the line 94. It should be understood that in many applications the lower sludge manifolds 84 can be eliminated such that all sludge removed from the central section 32 by the pump 92 is drawn into the sludge removal trough 72 via the upper sludge manifolds 80. Also, the pump 92 can be operated intermittently if desired.

The clarifier 30 provides a number of important advantages. Because the waste water entry port 50, the effluent ports 64, and the sludge removal ports 82 are all distributed along substantially the entire length of the central section 32, the horizontal velocity of waste water in the central section 32 is minimized. The major velocity component of waste water in the central section 32 is oriented upwardly, and this enhances the formation of a stable filter blanket in the intermediate zone around the upper sludge manifolds 80. The active sludge removal system described above controls the residence time of sludge within the central section 32 and minimizes problems associated with evolved gases and floating solids. Furthermore, the overall geometrical shape of the clarifier 30 provides a relatively small obstruction to flow in the oxidation ditch 10 and reduces the problems associated with excessive settling of solids in the oxidation ditch 10. In particular, the maximum width of the clarifier 30 is approximately two thirds the width of the flow path in the oxidation ditch 10. Furthermore, the side walls 40 converge toward the bottom, each having a slope preferably between 1:1 and 2:1. This shape for the clarifier 30 has been found to provide excellent results in terms of minimal interference with the flow of waste water in the oxidation ditch 10 in an efficient design which does not require excessive material for construction.

THE SECOND PREFERRED EMBODIMENT

Turning now to FIGS. 10 through 16, these figures relate to a second preferred embodiment 130 of the intrachannel clarifier of this invention. The clarifier 130 is positioned in an oxidation ditch 10 which may be identical to that described above. Element 10 through 24 of FIG. 10 correspond to the elements shown in FIG. 1, and will not be described again.

Figure 10:
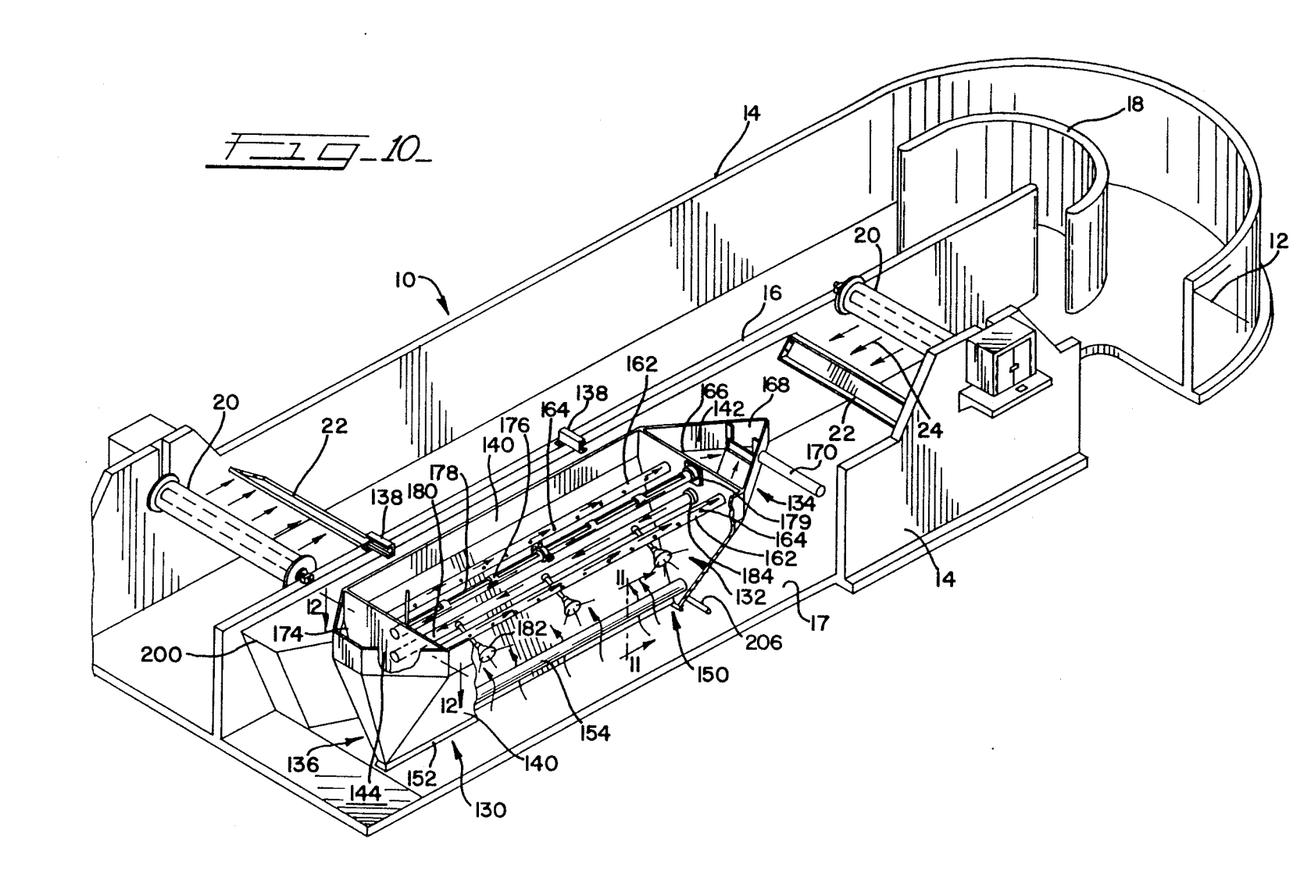
FIG. 10 is a fragmentary perspective view in partial cutaway of an oxidation ditch in which is mounted a second presently preferred embodiment of the intrachannel clarifier of this invention.
Figure 11:
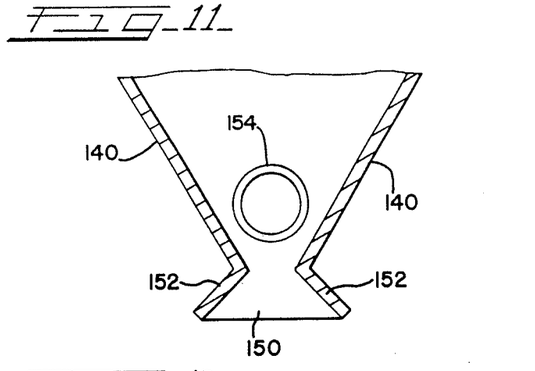
FIG. 11 is a partial sectional view taken along line 11—11 of FIG. 10.

As shown in FIG. 10, the clarifier 130 has a structural configuration quite similar to that of the clarifier 30 described above. The main differences between the clarifiers 30, 130 relate to the structures used to remove sludge and scum from the interior of the clarifier 130. As described in greater detail above, the clarifier 130 is made up of a central section 132, a front section 134 and a rear section 136. The clarifier 130 is held in place in the oxidation ditch 10 by support beams 138. The body of the clarifier 130 is made up two converging sidewalls 140, a streamlined front wall 142, and a streamlined rear section. A rear wall 144 separates a sludge well 174 from the main body of the clarifier 130.

As before, waste water enters the clarifier 130 via a waste water entry port 150 which is surrounded on two sides by stilling plates 152. A deflector tube 154 is positioned above the waste water entry port 150 to prevent incoming waste water from streaming upwardly in a narrowly concentrated mass. The deflector tube 154 breaks up the incoming flow of waste water and causes it to spread laterally across the width of the central section 132.

The clarified effluent removal system is quite similar to that discussed in connection with the first preferred embodiment. This system includes two effluent tubes 162 which are normally submerged and which define effluent removal ports 164. The effluent tubes 162 are in fluid communication with an effluent well 166 in the forward portion of the clarifier 130. This well 166 is in fluid communication via a weir with an effluent exit 168 that communicates with an effluent removal pipe 170. Clarified effluent which rises to the top of the central section 132 enters the effluent tubes 162 via the ports 164 and is transported by the tubes 162 to the well 166 and the exit 168. Clarified effluent is then removed from the clarifier 130 via the pipe 170.

In this embodiment the systems for removing sludge and floating scum from the central section 132 differ substantially from those described above, though they operate on similar principles.

In this embodiment a central skimming pipe 166 is mounted in the central section 132. This skimming pipe 176 defines an array of skimming ports 178, and the interior of the pipe 176 is in fluid communication with the sludge well 174. The skimming pipe 176 is isolated from the effluent well 166, and is supported for rotation on bearings 179. A handle 177 extends upwardly from one end of the skimming pipe 176, and this handle 177 can be used to rotate the skimming pipe 176 to any desired position within a range of angular positions.

Figure 12:
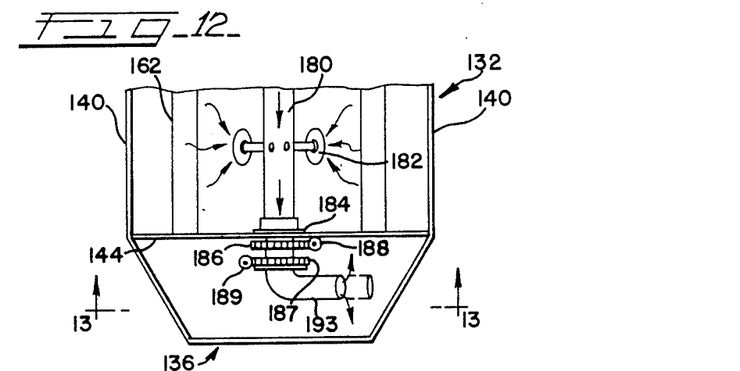
FIG. 12 is a fragmentary sectional view taken along line 12—12 of FIG. 10.
Figure 13:
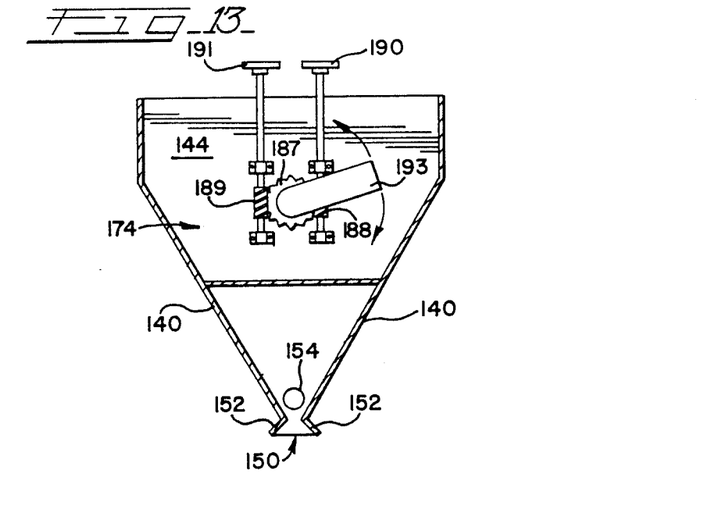
FIG. 13 is a fragmentary sectional view taken along line 13—13 of FIG. 12.

The sludge removal system of this embodiment includes a central sludge manifold 180 which is mounted for rotation in bearings 184. The sludge manifold 180 is isolated from the effluent well 166 but is in fluid communication with the sludge well 174 via an elbow 193 (FIG. 12 and 13). An array of sludge removal ports 182 (which are funnel shaped in this embodiment) communicate with the interior of the sludge manifold 180.

In this embodiment a rotatable coupling is provided between the elbow 193 and the sludge manifold 180, and separate gears 186, 187 are mounted on the sludge manifold 180 and the elbow 193. Each of the gears 186, 187 engages a respective worm 188, 189 and each of the worms 188, 189 is rotated by a respective handwheel 190. 191. The handwheels 190, 191 can be used to adjust independently the angular position of the elbow 193 (and therefore the flow rate of sludge out of the elbow 193 into the sludge well 174) and the angular position of the sludge manifold 180 (and therefore the elevation and orientation of the sludge removal ports 182).

Figure 14:
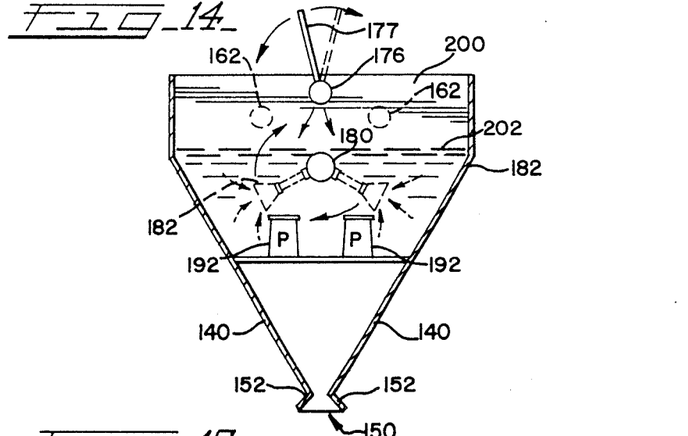
FIG. 14 is a somewhat schematic view showing the position of various components of the clarifier of FIG. 10.
Figure 15:
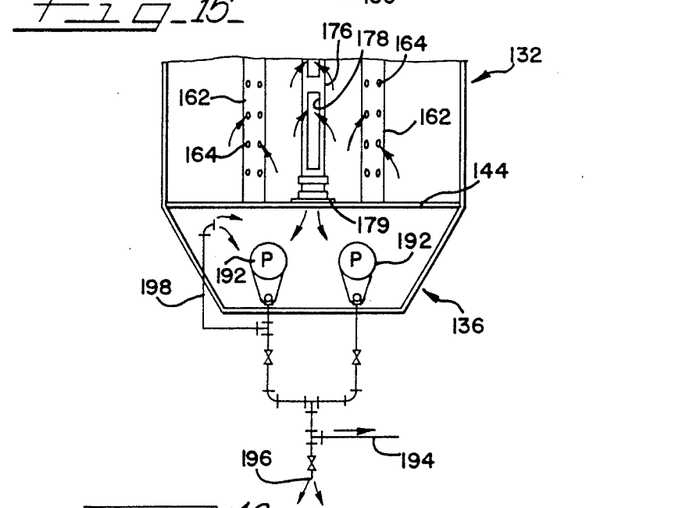
FIG. 15 is a top plan view of the rear portion of the intrachannel clarifier of FIG. 10 with components of the sludge manifold deleted for clarity.

As shown in FIGS. 14 and 15, two sludge pumps 192 are positioned in the sludge well 174, and the sludge pumps 192 remove sludge from the sludge well 174 either for removal from the oxidation ditch 10 via a sludge waste line 194 or for return to the oxidation ditch 10 via a sludge return line 196. A portion of the output of one of the pumps 192 may be returned to the sludge well 174 via a mixer line 198 to promote turbulence and mixing in the sludge well 174.

In the drawings reference numeral 200 is used to indicate the water level in the oxidation ditch 10, which is substantially equal to the water level in the clarifier 130. Reference numeral 202 is used in FIG. 14 to indicate the top of the sludge blanket inside the central section 132 of the clarifier 130, and reference numeral 206 identifies a drainage pipe used to empty the front section 134 when the clarifier 130 is removed from the ditch 10.

The clarifier 130 operates according to the same principles as those described above in conjunction with the clarifier 30. In particular the flow of waste water within the central section 132 is controlled to form a stable filter blanket in the region of the sludge removal ports 182. Clarified effluent is removed from the central section 132 via the effluent tubes 162. Preferably, the flow rates through the various ports are as described above. By way of example, adjacent sludge removal ports 182 on each side can be separated from each other by four feet.

The rotatable skimming pipe 176 provides important advantages in operation. In particular, an operator can use the handle 177 to position the skimming pipe 176 as desired to remove floating scum from the central section 132. Typically a catwalk (not shown) is disposed above the central section 132 and an operator on the catwalk can position the handle 177 first to one side to remove floating scum from that side of the central section 132 via the skimming pipe 176. The handle 177 can then be used to reposition the skimming pipe 176 to remove floating scum from the other side of the central section 132.

Figure 16:
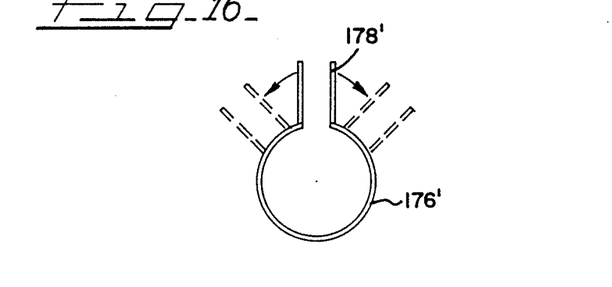
FIG. 16 is a fragmentary sectional view of an alternate skimming pipe suitable for use in the clarifier of FIG. 10.

Furthermore, the skimming pipe 176 can be adjacent for variations in the water level within the central section 132. FIG. 16 shows an alternate embodiment 176' of the skimming pipe which is provided with a tube-like skimming port 178'. There is a larger variation in water level between the solid line position of the skimming port 178 and the dotted line alternative positions in FIG. 16 than in the skimming pipe 176 of FIG. 10.

The rotatable sludge manifold 180 and elbow 193 provide further advantages. By rotatably positioning the sludge manifold 180 as desired, the sludge removal ports 182 can be raised or lowered to accommodate varying positions of the sludge blanket. In an alternate embodiment (not shown) there are two sludge manifolds arranged alongside and parallel to one another. A single handwheel operated worm gear rotates the two sludge manifolds and is positioned such that the sludge removal ports are raised and lowered in unison. These features of the invention allow the position of the sludge removal ports 182 to be adjusted as necessary for varying operating conditions. Also, the rotatable sludge manifold 180 facilitates cleaning of the sludge removal ports 182. The handwheel 190 can be used to rotate the manifold 180 to point the ports 182 upwardly, where they are easily cleaned.

The rotatable elbow 193 allows ready adjustment of the rate of removal of sludge through the sludge removal manifold 180. In particular, when the elbow 193 is lowered the flow of sludge through the sludge manifold 180 into the sludge well 174 is increased. The above described features of the rotatable sludge manifold 180 and elbow 193 allow the clarifier 130 to be adjusted in a particularly simple, direct, and low cost manner to achieve desired operating characteristics.

Of course, it should be understood that a wide range of changes and modifications can be made to the preferred embodiments described above. For example, the sludge pump 92 can be replaced with a remote pump, a siphon, or a gravity drain to remove sludge from the oxidation ditch 10. The effluent pipes 62 can be replaced with conventional U-shaped troughs that extend partially above the level of the water. The waste water inlet can be configured as desired, and may include a plurality of separate inlets as well as baffles. The sludge pump 92 can be mounted directly to the sludge return pipes 86, thereby eliminating the need for a sludge trough. Furthermore, the materials, geometry, spacing and arrangement of component parts can all be modified as necessary to suit the particular application. It is therefore intended that the foregoing detailed description be regarded as illustrative rather than limiting, and that it be understood that it is the following claims, including all equivalents, which are intended to define the scope of this invention.

I claim:

1. In a waste treatment facility of the type comprising means for defining a flow path for a body of waste water, aeration means, and means for circulating the waste water along the flow path, an improved intra-channel clarifier comprising:

an enclosure positioned in the flow path, said enclosure comprising a perimeter wall which surrounds an internal volume which comprises an upper zone, a middle zone, and a lower zone, wherein the cross-sectional area of the internal volume increases progressively from the lower zone to the upper zone;

a water inlet port positioned to introduce waste water from the flow path into the lower zone;

means positioned in the upper zone for removing clarified water from the upper zone;

a sludge removal manifold disposed in the middle zone:

means for actively removing sludge from the middle zone via the sludge removal manifold to reduce the residence time of sludge in the middle zone; and means for spreading the incoming flow of waste water from the water inlet port laterally with respect to the flow path across the width of the enclosure:

said enclosure, water inlet port, spreading means, clarified water removing means, and sludge removal manifold configured to create a stable filter blanket of sludge in the middle zone as the waste water circulates past the enclosure.

2. The clarifier of claim 1 wherein the enclosure defines a length axis extending along the flow path, and wherein the sludge removal manifold extends along the length axis and defines an array of sludge removal ports distributed along the length axis.

3. The clarifier of claim 1 wherein the enclosure defines a width extending across the flow axis and wherein the width of the enclosure is substantially equal to two-thirds of the width of the flow path.

4. The clarifier of claim 1 wherein the enclosure is elongated in the direction of the flow path and wherein each side of the perimeter wall slopes inwardly in the middle zone at a slope in the range of 1:1 to 2:1.

5. The clarifier of claim 1 wherein the clarified water removing means comprises at least one submerged effluent pipe extending along the flow path along the length of the enclosure, and wherein the pipe defines an array of submerged effluent removal ports distributed along the length of the pipe.

6. The clarifier of claim 1 wherein the sludge removing means comprises:
   a sludge trough extending along the flow path along the length of the enclosure;
   means for connecting the sludge removal manifold to the sludge trough such that sludge moves from the sludge removal manifold to the sludge trough; and
   means for actively removing sludge from the sludge trough.

7. The clarifier of claim 6 wherein the means for actively removing sludge from the sludge trough comprises a pump positioned in the sludge trough.

8. The clarifier of claim 6 further comprising:
   a plurality of skimming ports in the sludge removal trough positioned to pass a surface flow from the upper zone into the sludge removal trough.

9. The clarifier of claim 1 wherein the water inlet port comprises at least one opening defining an elongated inlet structure positioned at the bottom of the clarifier parallel to the flow path, and wherein the spreading means comprises a deflector mounted in the lower zone above the water inlet port to deflect incoming water laterally with respect to the flow path.

10. The clarifier of claim 9 wherein the deflector comprises a cylindrical tube oriented parallel to the elongated opening.

11. The clarifier of claim 9 wherein the minimum separation between the deflector and the perimeter wall on each side of the deflector is equal to one half the width of the elongated opening.

12. In an oxidation ditch of the type comprising means for defining a flow path for a body of waste water, means for circulating the waste water along the flow path, and means for aerating the waste water, an improved intrachannel clarifier comprising:
   an enclosure positioned in the flow path, said enclosure comprising a front section, a rear section, an upper portion extending partially above the level of the waste water, and a lower portion, said enclosure defining a length axis extending along the flow axis;
   a sludge removal trough extending along the length axis and mounted in the upper portion of the enclosure so as to extend above the level of the waste water;
   at least one effluent removing means extending along the length axis and mounted in the upper portion of the enclosure so as to extend below the level of the waste water;
   a waste water inlet port positioned in the lower portion along the length axis to introduce waste water into the enclosure;
   a plurality of effluent removal ports in the effluent removal means spaced along the length axis to remove effluent from the enclosure at a selected effluent removal rate, thereby creating an upward flow of waste water from the waste water inlet port in order to suspend solids in a filter zone situated between the waste water inlet port and the effluent removal ports;
   at least one sludge removal manifold disposed in the filter zone and extending along the length axis, said manifold defining an array of sludge removal ports spaced along the length axis for removing sludge from the filter zone, said manifold communicating with the sludge removal trough to conduct sludge from the filter zone to the sludge removal trough; and
   means for actively removing sludge out of the sludge removal trough at a selected sludge removal rate in order to remove sludge from the filter zone to reduce the residence time of sludge in the filter zone;
   said waste water inlet port sized and dimensioned to ensure that substantially no sludge leaves the clarifier through the waste water inlet port.

13. The clarifier of claim 12 further comprising:
   an array of skimming ports defined by the sludge removal trough and positioned to admit floating materials from the upper portion of the enclosure into the sludge removal trough.

14. The clarifier of claim 12 wherein the enclosure defines a maximum width extending transverse to the length axis, and wherein the width of the enclosure is substantially equal to two thirds of the width of the flow path.

15. The clarifier of claim 12 wherein the enclosure comprises a pair of side walls which converge towards the lower portion, each disposed at a slope in the range of 1:1 to 2:1.

16. The clarifier of claim 12 wherein the means for actively removing solids from the sludge removal trough comprises a pump positioned in the sludge removal trough.

17. The clarifier of claim 12 wherein each of the effluent removal means is completely submerged below the level of the waste water.

18. The clarifier of claim 12 wherein the spreading means comprises a deflector mounted in the lower zone above the water inlet port to deflect incoming waste water laterally with respect to the length axis.

19. The clarifier of claim 18 wherein the deflector comprises a cylindrical tube.

20. The clarifier of claim 18 wherein the separation transverse to the length axis on each side of the deflector between the deflector and the enclosure is equal to one half the width of the waste water inlet port measured transverse to the length axis.

21. The clarifier of claim 12 further comprising means for spreading the incoming flow of waste water from the waste water inlet port laterally across the width of the enclosure.

* * * * *